United States Patent
Horn et al.

(10) Patent No.: US 11,900,081 B2
(45) Date of Patent: Feb. 13, 2024

(54) COMPUTER-IMPLEMENTED METHOD AND TECHNICAL SYSTEM FOR TASK-ORIENTED SYSTEM DEFINITION, IMPLEMENTATION AND OPERATION

(71) Applicant: Siemens Aktiengesellschaft, Munich (DE)

(72) Inventors: Stefan Horn, Erlangen (DE); Christian Körner, Bergen (DE); Manfred Sand, Fürth (DE); Reinhold Plösch, Linz (AT)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 17/408,923

(22) Filed: Aug. 23, 2021

(65) Prior Publication Data

US 2022/0066748 A1    Mar. 3, 2022

(30) Foreign Application Priority Data

Aug. 25, 2020 (EP) .................................... 20192521

(51) Int. Cl.
*G06F 8/35* (2018.01)
*G06F 8/10* (2018.01)
*G06F 8/41* (2018.01)

(52) U.S. Cl.
CPC .................. *G06F 8/35* (2013.01); *G06F 8/10* (2013.01); *G06F 8/433* (2013.01)

(58) Field of Classification Search
CPC ....................................................... G06F 8/35

(Continued)

(56) References Cited

U.S. PATENT DOCUMENTS 10,802,815 B1 * 10/2020 Wang ......................... G06F 8/65
10,901,728 B1 * 1/2021 Negoshian ................ G06F 8/61
(Continued)

FOREIGN PATENT DOCUMENTS

EP           3696739 A1 *  8/2020
WO   WO-2021250600 A1 * 12/2021

OTHER PUBLICATIONS

Florian Garner; "TAICOSViewer—Automated evaluation of non-functional requirements at feature level"—Master's Thesis to confer the academic degree of Master of Science in the Master's Program; Johannes Kepler University Linz Altenbergerstraße 69—Jan. 14, 2020.*

(Continued)

*Primary Examiner* — Francisco J Aponte
(74) *Attorney, Agent, or Firm* — Slayden Grubert Beard PLLC

(57) ABSTRACT

Various embodiments include a computer-implemented method for task-oriented system definition, implementation and operation, the method comprising: importing representative model data including predefined model parameters by an interface component; importing one or more requirements for the model parameters by the interface component; executing measurement and importing measurement results data; aggregating and evaluating imported data, wherein the evaluation is performed depending on the requirements and measurement results data; storing imported data to a computer-readable storage component; operationalizing by adding measurements to the model requirements; and generating a task based on an algorithm performing a functional analysis of the model requirements.

12 Claims, 4 Drawing Sheets

(58) Field of Classification Search
USPC ............................................................. 717/104
See application file for complete search history.

(56) References Cited

U.S. PATENT DOCUMENTS

| | | | | |
|---|---|---|---|---|
| 11,294,669 | B2* | 4/2022 | Hohenstein | G06F 8/61 |
| 11,315,208 | B2* | 4/2022 | Adams | G06Q 10/067 |
| 11,354,120 | B1* | 6/2022 | Zhang | G06F 8/76 |
| 11,475,321 | B2* | 10/2022 | Rangarajan | G06F 11/3604 |
| 11,501,033 | B2* | 11/2022 | Wardlaw | G06F 30/12 |
| 11,586,423 | B2* | 2/2023 | Körner | G06F 8/77 |
| 2019/0171438 | A1* | 6/2019 | Franchitti | G06N 20/00 |
| 2019/0205542 | A1* | 7/2019 | Kao | G06F 8/70 |
| 2020/0167145 | A1* | 5/2020 | Franchitti | G06N 5/022 |
| 2021/0374569 | A1* | 12/2021 | Jezewski | G06N 20/00 |
| 2021/0382709 | A1* | 12/2021 | Sagal | G06F 8/71 |
| 2022/0366190 | A1* | 11/2022 | Ghosh | G06N 20/00 |

OTHER PUBLICATIONS

Matthias Vianden; "Systematic Metric Systems Engineering: Reference Architecture and Process Model"—Shaker, 2017.*

Dhaya Sindhu Battina; "An Intelligent DEVOPS Platform Research and Design Based on Machine Learning"; Campbellsville University—Mar. 2019.*

Ferry, Nicolas, et al. "Enact: Development, operation, and quality assurance of trustworthy smart iot systems." Software Engineering Aspects of Continuous Development and New Paradigms of Software Production and Deployment: First International Workshop, DEVOPS 2018, Chateau de Villebrumier, France, Mar. 5-6, 2018.*

Search Report for EP Application No. 20192521.1, 13 pages, Feb. 16, 2021

Haindl, Philipp et al.; "Tailoring and Evaluating Non-Functional Interests Towards Task-Oriented Functional Requirements", Software Engineering Conference, XP055772740, Feb. 1, 2020

Wagner, Stefan et al.; "Operationalised product quality models and assessment: The Quamoco approach", arxiv.org, Cornell University Library, 201 Olin Library Cornell University Ithaca, NY 14853, XP080735114, DOI: 10.1016/J.INFSOF.2015.02.009, Nov. 28, 2016.

Haindl, Philipp et al.; "An Extension of the Quamoco Quality Model to Specify and Evaluate Feature-Dependent Non-Functional Requirements", 2019 45th Euromicro Conference on Software Engineering and Advanced Applications (SEAA), IEEE, pp. 19-28, XP033662525, DOI: 10.1109/SEAA.2019.00012, Aug. 28, 2019.

* cited by examiner

COMPUTER-IMPLEMENTED METHOD AND TECHNICAL SYSTEM FOR TASK-ORIENTED SYSTEM DEFINITION, IMPLEMENTATION AND OPERATION

CROSS-REFERENCE TO RELATED APPLICATIONS

This application claims priority to EP Application No. 20192521.1 filed Aug. 25, 2020, the contents of which are hereby incorporated by reference in their entirety.

TECHNICAL FIELD

The present disclosure is related to task-oriented management. Various embodiments of the teachings herein may include computer-implemented methods and/or technical systems for task-oriented system definition, implementation, and operation, computer programs, and/or computer-readable storage media.

BACKGROUND

Existing approaches to balance engineering requirements and tasks with respect to functionality, quality, time and/or value/costs rely on different definitions. Therefor a formalization is missing, that would integrate several different approaches and different definitions respectively. Some of the approaches described, like value stream analysis and value stream mapping, are methods to improve repetitive processes. However, software engineering is a creative process to which methods improving repetition don't apply.

It is therefore an objective of the present invention to provide the necessary speed and scale for right-sizing functionality and quality of software systems, especially in the field of value-based software engineering. As an example, some embodiments of the teachings herein include computer-implemented method for task-oriented system definition, implementation and operation, providing importing representative model data including predefined model parameters by an interface component (I/O), importing one or more requirements (req), especially quality requirements, for the model parameters by the interface component (I/O), executing measurement and importing measurement results data,
aggregating and evaluating imported data, wherein the evaluation is performed depending on the requirements and measurement results data, storing imported data to a computer-readable storage component (Stor), operationalizing, wherein measurements are added to the model requirements, and generating task based on an algorithm performing a functional analysis of the model requirements.

In some embodiments, there is a model definition step.

In some embodiments, there is a configuration step, wherein the configuration of a measurement component is created.

In some embodiments, there is an alignment step, providing an alignment with additional requirements outside the model.

In some embodiments, there is a verification step, wherein a check of model libraries is provided.

In some embodiments, there is an improvement and/or audit step or a combination of these, wherein a timeline check of the whole process is provided to ensure quality of created task data.

In some embodiments, there are recursive refinements of tasks and their attributes.

In some embodiments, there is an implementation where split and/or detailed subtasks are compliant to the attributes required for the subtasks.

As another example, some embodiments include a computer system (cs) comprising: a processor (p), an interface component (I/O) for importing representative model data including predefined model parameters and importing one or more requirements (req), especially quality requirements, for the model parameters, at least a first computer-readable storage component (Stor) storing imported model data, a second computer-readable storage component (Meas) storing measurement tools and a software component executing measurement tools and importing measurement results data, a software component performing aggregating and evaluating imported data, wherein the evaluation is performed depending on the requirements and measurement results data, a further software component for operationalizing, wherein measurements are added to the model requirements and a task generation software component comprising an algorithm performing a functional analysis of the model requirements.

In some embodiments, there is a software component for model definition and/or a further storage component (Hist) for history management and/or comprising an application layer (app).

In some embodiments, the interface component (I/O) is arranged with a presentation layer, e.g. with at least a presentation software component like a presentation server (sere).

In some embodiments, the measurement tool provides measurement data for verification, evaluation, improvement or audit components.

In some embodiments, there is an observed system component for an intelligent DevOps system.

As another example, some embodiments include a computer program product comprising instructions which, when the program is executed by a computer, cause the computer to carry out the steps of the methods described herein.

As another example, some embodiments include a provision apparatus for the computer program products described herein, wherein the provision apparatus stores and/or provides the computer program product.

BRIEF DESCRIPTION OF DRAWINGS

Further implementations of example methods and computer systems follow readily from the various implementations and embodiments of the computer-implemented method and computer system vice versa. The teachings herein are further be explained with respect to exemplary implementations and respective figures. In the figures, identical or functionally identical elements are denoted by identical reference signs.

DETAILED DESCRIPTION

Figure 1:
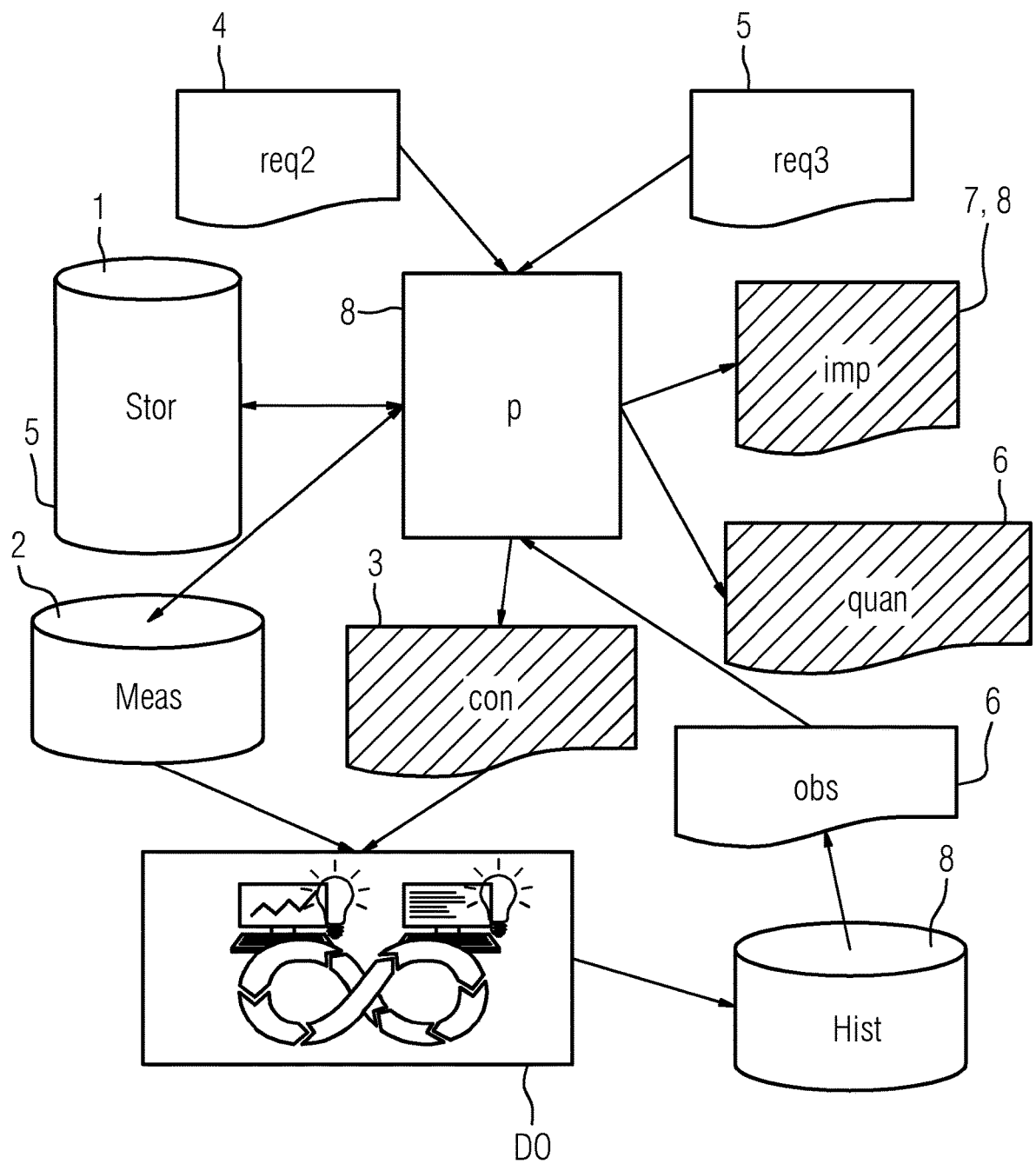
FIG. 1 shows an overview of a use case for the described method with reference to system components.

Various embodiments of the teachings herein include a computer-implemented method for task-oriented system definition, implementation and operation, which provides the measures of importing representative model data including predefined model parameters by an interface component, importing one or more requirements, especially quality requirements, for the model parameters by the interface component, executing measurement and importing measurement results data, aggregating and evaluating imported data, wherein the evaluation is performed depending on the requirements and measurement results data, storing imported data to a computer-readable storage component, operationalizing, wherein measurements are added to the model requirements and generating task based on an algorithm performing a functional analysis of the model requirements.

The proposed method may be based on operational models for product quality, incorporating value and cost models, and provides sufficient flexibility and a high automation grade to achieve the accuracy and speed required for functional feedback loops in the software engineering domain. The method comprising a model-based process realizes a formalized process sufficiently strong even to integrate a plurality of models, especially with different definitions.

In contrast to many engineering disciplines moving rather slow and processes can be predicted, this method deals with software-based systems, which move exponentially, so prediction is very error prone. One approach is to measure frequently, exactly, and precisely to the target to reduce these estimation errors in a way, so that useful data is available to make plans and revise them frequently. The impediment of measurements of software and related artefacts, which size is exponentially growing over time is met with the measurement(s) being automated. So, they are affordable in scale.

In some embodiments, the computer-implemented method further comprises a model definition step.

In some embodiments, the computer implemented method further comprises a configuration step, wherein the configuration of a measurement component is created.

In some embodiments, the computer implemented method further comprises an alignment step, providing an alignment with additional requirements outside the model.

In some embodiments, the computer implemented method further comprises a verification step, wherein a check of model libraries is provided.

In some embodiments, the computer implemented method further comprises an improvement and/or an audit step or a combination of these, wherein a timeline check of the whole process is provided to ensure quality of created task data.

In some embodiments, the computer implemented method further comprises recursive refinements of tasks and their attributes. This provides the advantage, that large abstract tasks can be split up and detailed till they are implemented in a development step supporting agile methods. Additionally, the development and operational attributes can be aggregated back to the original large and abstract definition automatically for monitoring purposes.

In some embodiments, the computer implemented method further comprises an implementation where split and/or detailed subtasks are compliant to the attributes required for the subtasks.

Some of the embodiments of the teachings herein include a computer system, that comprises a processor, an interface component for importing representative model data including predefined model parameters and importing one or more requirements, especially quality requirements, for the model parameters, at least a first computer-readable storage component, storing imported model data, a second computer-readable storage component, storing measurement tools and a software component executing measurement tools and importing measurement results data. The computer system further comprises a software component performing aggregating and evaluating imported data, wherein the evaluation is performed depending on the requirements and measurement results data, a further software component for operationalizing, wherein measurements are added to the model requirements and a task generation software component comprising an algorithm performing a functional analysis of the model requirements.

In some embodiments, the interface component e.g. comprises a chat bot. The first storage component may provide a knowledgebase, e.g. the models in question.

In some embodiments, the computer system further comprises a software component for model definition and/or a further storage component for history management and/or comprises an application layer.

In some embodiments, the computer system provides an interface component, which is arranged with a presentation layer, e.g. with at least a presentation software component like a presentation server.

In some embodiments, the measurement tool provides measurement data for verification, evaluation, improvement or audit components.

In some embodiments, the computer system further comprises an observed system component for an intelligent DevOps system.

In some embodiments, there is a computer program product comprising instructions which, when the program is executed by a computer, cause the computer to carry out the steps of the computer-implemented method according to above described embodiments. In some embodiments, there is a provision apparatus for storing and/or providing the computer program product. The provision apparatus is a data storage medium that stores and/or provides the computer program product, for example. In some embodiments, the provision apparatus is a network service, a computer system, a server system, particularly a distributed computer system, a cloud-based computer system and/or a virtual computer system that stores and/or provides the computer program product preferably in the form of a data stream, for example.

This provision may be effected as a download in the form of a program data block and/or instruction data block, e.g. as a file, particularly as a download file, or a data stream, particularly as a download data stream, of the complete computer program product, for example. This provision can be effected as a partial download that consists of multiple parts and is downloaded particularly via a peer-to-peer network or provided as a data stream, for example. Such a computer program product is read in, for example using the provision apparatus in the form of the data storage medium, in a system and executes the program instructions, so that the method according to the invention is executed on a computer, or configures the creation device such that it creates cited system and/or execution unit as described herein.

To conclude, the disclosure describes computer-implemented methods and technical systems for task-oriented system definition, implementation and operation. Task attributes are optimized by development and application of operational models, in particular for models in the product and service development or applicable for cost and value models. This approach provides the necessary speed and scale especially for value-based software engineering with automated measurement and aggregation agg, especially for non-monetary values, to realize a formalized process sufficiently strong even to integrate a plurality of models, especially with different definitions. The basic advantage however is the fast and unbiased feedback by an automated monitoring system based on a formal model.

The methods described herein comprise at least one model-based process, e.g. a simulation. Examples for model-based processes are energy optimization for product development, efficiency optimization, e.g. for software development, even applicable for target costing. The method comprises at least one of the following steps, like model definition, operationalization, configuration, alignment, verification, evaluation, improvement or audit or a combination of these.

The technical systems described herein comprise at least one software component for model definition, operationalization, configuration, alignment, verification, evaluation, improvement or audit or a combination of these. The technical system comprises an interface component (I/O), e.g. comprising a chat bot, a first storage component for knowledgebase, e.g. the models in question, a second storage component for history management, a processor, an observed system component, e.g. for intelligent DevOps system. The technical system further comprises at least one presentation layer, e.g. with at least a presentation software component (presentation server), an application layer and a measurement tool, e.g. providing measurement data input for verification, evaluation, improvement or audit components.

Different definitions of several improvement approaches in engineering can be unified and based on the same dataset and using the same measurement tools. Spanning several methods like value stream analysis, value engineering, QFD, design to cost design to value design thinking etc. So, new models with different requirements can be integrated in one task optimization process. Functionality and quality for developments and operations can be taken into account under one model or one system respectively, e.g. automating the dynamic feedback nature of DevOps systems.

Definitions

Model-Based Process:

This model-based process in particular is a disciplined process for determining and achieving an optimized task set, e.g. for product and/or service development, in particular comprising a full-stream cost at which a proposed product with specified functionality, performance, and quality must be produced in order to generate the desired profitability at the product's anticipated selling price over a specified period of time in the future.

Technical System:

As used herein, the term "a technical system" refers, for example, to a device, apparatus or a plant. A technical system can, for example, be a field device. Preferably, the technical system comprises a plurality of hardware components and/or software components. Furthermore, the technical system can, for example, comprise at least one component having a communication interface configured to connect the inventive apparatus to an environment, user and/or other system.

Unless specifically stated otherwise, it is appreciated that throughout the specification discussions utilizing terms such as "processing", "computing", "computer-based", "calculating", "determining", "generating", "configuring" or the like, refer to the action and/or processes of a computer that manipulates and/or transforms data into other data, said data represented as physical, e.g. such as electronic, quantities.

The term "computer" should be expansively construed to cover any kind of electronic device with data processing capabilities, including, by way of non-limiting example, personal computers, servers, handheld computer systems, Pocket PC devices, Cellular communication device and other communication devices with computing capabilities, processors and other electronic computing devices.

Model Definition:

A model definition is a use-case about creating and maintaining of model libraries. It includes import and export. Further it extends to the respective quality models to implement the rules the model(s) should follow. Multiple aspect hierarchies can be defined to provide different points of view on the model data. Details like coverage, precision frequency should be added. This is the definitory part of method which states what creates and represents the model or the model data.

Operationalization:

In the context of this application, operationalization adds the measurements to the model factors.

Create Configuration:

Creates the configuration of measurement tools to execute the measurement. May contain data input steps where automatic measurement is missing.

Strategy Alignment:

In case an (engineering) strategy is available we need to align the model(s) with the strategy.

Verification:

Check of model libraries for coverage and precision and additional model rules or requirements from engineering strategy.

Evaluation:

Processing of observation data, created based on measurement configuration.

Improvement:

Improvement comprises model improvement as well as artefact improvement.

Audit:

Timeline check of the whole process to ensure quality of created data. This step is a different kind of verification concerned with the use and improvement of the model over time and requires a different kind of authorization.

Components:

Here and in the following, the interface component, the task generation software component, the data storage components as well as other components referred to, may for example be software modules of a computer program for carrying out the computer-implemented method. Alternatively, the modules may correspond to respective hardware modules with software for carrying out the respective steps stored on them.

FIG. 1 shows an overview of a use case for the described method with reference to system components. The processor p is designed to perform an audit process 8. A storage component for models, Stor, provides the model definition 1 to the processor p. The storage component, Stor, e.g. further provides the processor p with verification data in a verification step 5. The processor p is further provided with evaluation data, ev, in an evaluation step 6 based on observation data, obs, e.g. stored in a storage component for historian data, Hist.

In some embodiments, the system comprises a further storage component for measurement tools, Meas, for the operationalization 2. There is further input to the processor p, e.g. additional requirements, req2, like strategy requirements, user requirements, business rules, cost requirements for the alignment process 4 and/or additional requirements, req3, for example to perform another verification step 5. The processor p therefrom creates a configuration 3 and provides configuration data, con, respectively. The configuration data, con, is further provided to the storage components for measurement tools, Meas, and historian data, Hist, to support an DevOps-based process, DO. The processor p further provides quantification data, quan, for example for another evaluation step 6 and/or improvement and/or audit results data, imp, on which an improvement derivation 7 can be based. Processor output is marked by hachures in FIG. 1.

Figure 2:
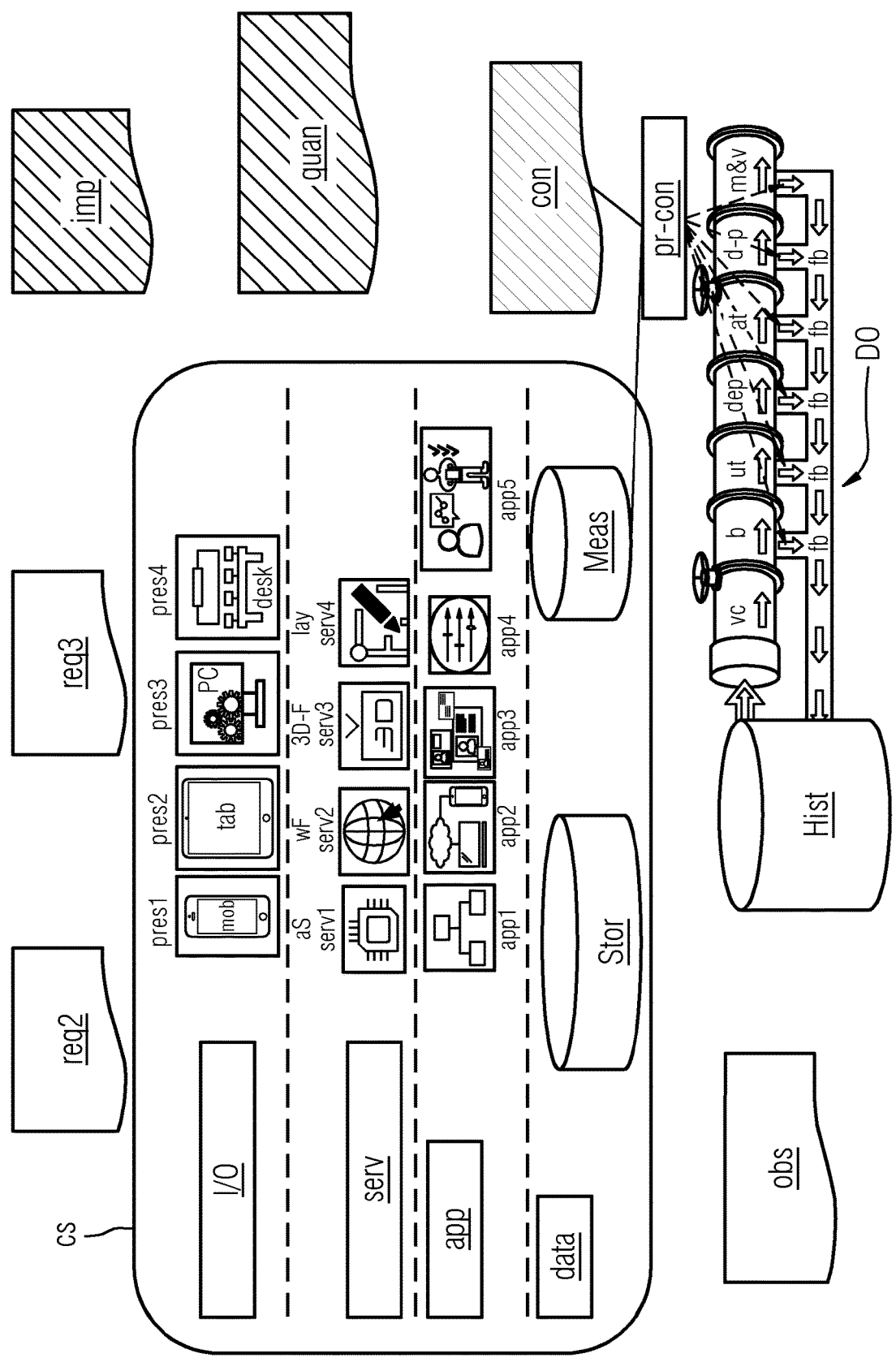
FIG. 2 shows a system overview of the described computer system cs.

FIG. 2 shows a system overview of the described computer system cs. It comprises an interface component or interface layer I/O, a server component or server layer, serv, e.g. a presentation server, an application component or application layer, app, and a data layer, data, e.g. comprising storage components, Stor and Meas. The interface layer I/O comprises several presentation modules pres1-4, to present the system's data on common devices like mobile devices, mob, in applications, on tablets, tab, for example on web pages, on personal computers, PC, and/or control room desks or control centers, desk, in web pages or applications. The server layer, serv, for example a presentation server, comprises several presentation server modules, serv1-4, e.g. an appServer, aS, webFormats wF, 3D-Formats 3D-F and/or a Layout module, lay.

In the server layer, the data formats are created and messages from the different devices are collected. This requires modules for application data generation, or Web data formats, or 3D-Objects with a layout service respectively. The application layer, app, comprises several application modules, app1-6, e.g. modules for accounts, app1, for data access, app2, for modeler, app3, for configurator, app4, for evaluator app5 and/or auditor, app6. Since there is sensitive data handled, the system cs provides user accounts with access rights based on data and functionality, e.g. provided by an accounts module. Data access needs to be restricted accordingly by the data access module, which additionally provides an abstraction to the different underlying eventually distributed datastores. The Modeler, app3, e.g. is controlling the model libraries including create, import, export and modification. A configuration module, app4, creates configuration of measurement tool, meas, given a model and the measurement tool library, Meas. Evaluator module, app5, is responsible for all the rule-based checks. Auditing is a very special use-case with special, for instance time constricted, access rights and functionality and is therefore put in a special module, app6, not shown.

In a DevOps approach, DO, the configuration, con, is probed, pr-con, comprising steps like version control vc, build b, unit test ut, deploy dep, deploy to production d-p, auto test at, measure & validate m&v and feedback fb, e.g. production feedback.

Input to the computer system cs comes from strategy or product requirements, req2, req3, and/or from observation data, obs. A knowledgebase of Operational models and quality models are provided by storage components, Stor and Meas, respectively. A further storage component, Hist, is comprised for historian data storage and a processor p for performing the audit 8. In some embodiments, a 4-layered processor approach is used to describe the decomposition of an operational module in more detail. The computer system's cs output provides configuration data, con, quantification data, quan, and improvement proposals, imp. An observed system, e.g. an intelligent DevOps system or DevOps pipeline, DO is provided.

Models and measurement tools, meas, are part of the system cs. The storage component for historian data, Hist, is part of the intelligent DEVOPS system DO. Observation data, obs, can also be imported from outside if necessary.

Figure 3:
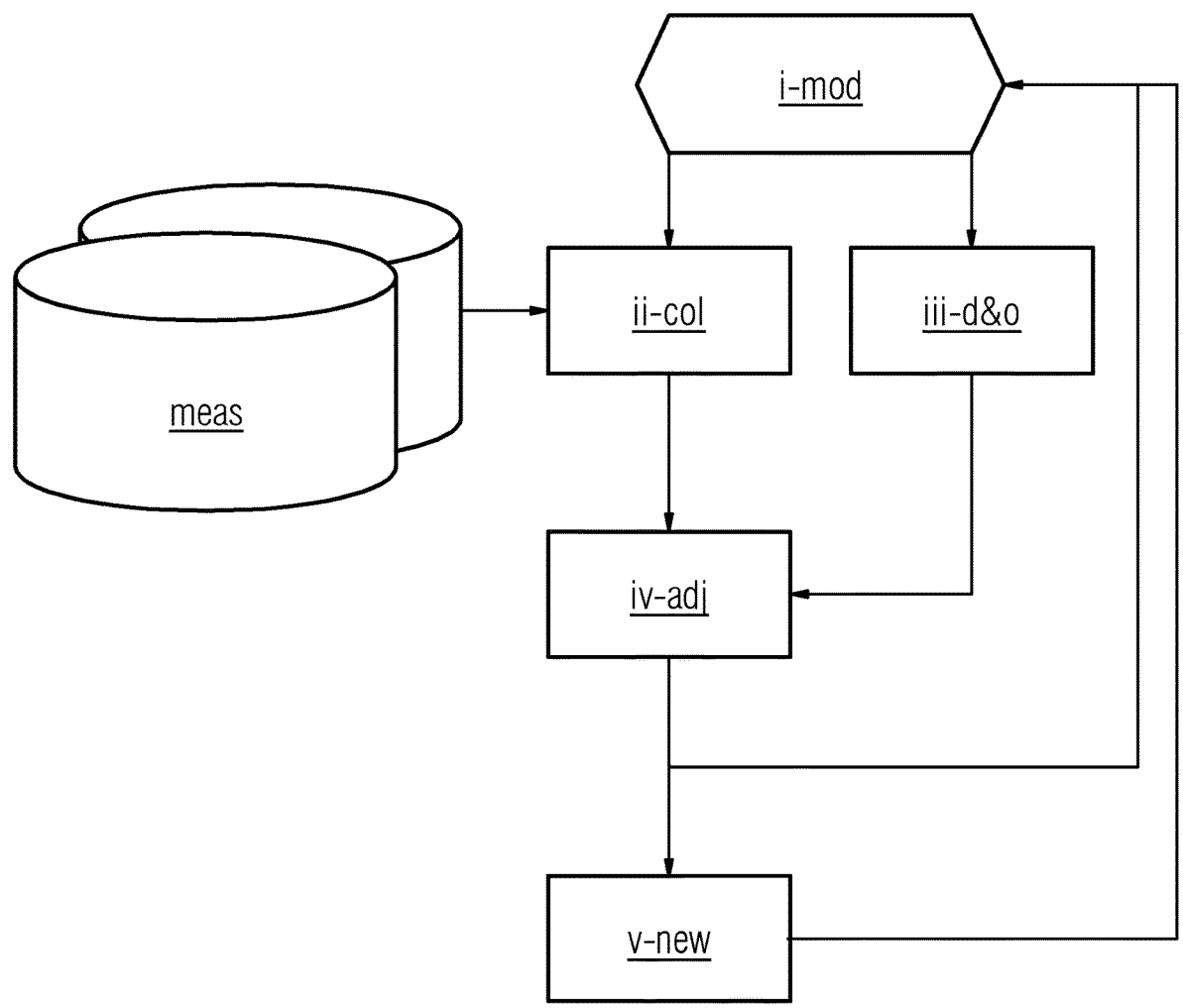
FIG. 3 shows an alternative overview of an intelligent DevOps DO approach.

FIG. 3 shows an alternative overview of an intelligent DevOps DO approach: A further storage component, meas, is provided. Data on actual revenue is collected. Data on customer and business interest is collected and data on technical interests is collected, to see whether the right product is provided. Actual cost data is collected. Plans can be revised by re-scheduling, reducing or increasing plans.

Starting from an initial model, i-mod, that is or is based on a product roadmap, project plan, or model, e.g. TAICOS model, data is collected, ii-col, and tasks are developed and operated, iii-d&o. To adjust roadmap and/or project plan, iv-adj, there is a feedback loop provided to the initial model, i-mod. The planning of new features, v-new, better features, is based on available, more precise data.

Figure 4:
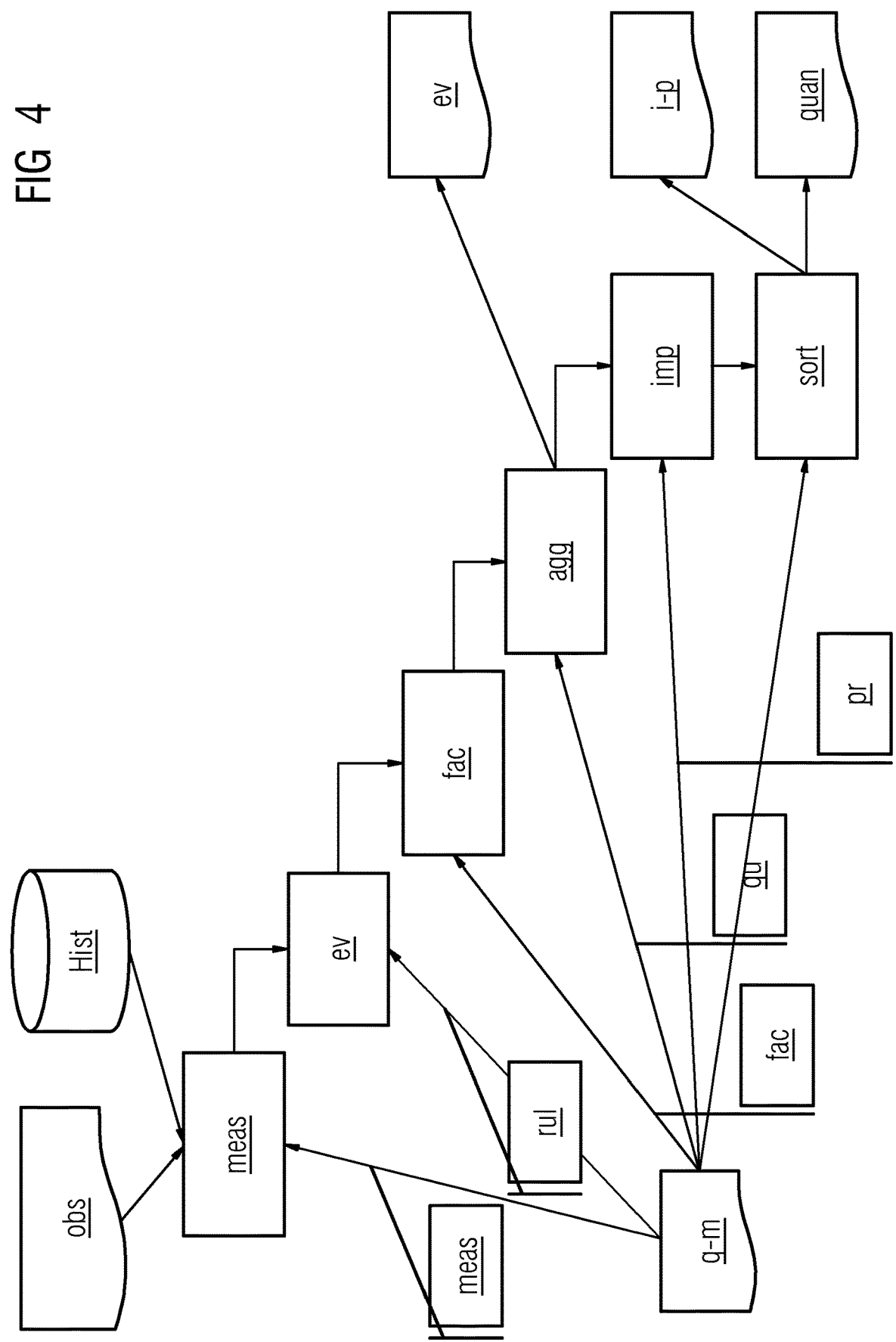
FIG. 4 shows an overview of the evaluation ev of observation data, obs, for a quality model q-m.

FIG. 4 shows an overview of the evaluation ev of observation data, obs, for a quality model q-m. In a first step, quality model data q-m is collected and added with measurements, meas, observation data, obs and historian data. Following certain rules, rul, an evaluation ev is performed. Following factors, fac, and qualities, qu, data is factored and aggregated. Considering principals, pr, an improvement step, imp, is provided, followed by a sorting step, sort, in which improvement proposals, i-p, and quantification data, quan, are provided.

A further example are operational models, that need to be adaptable to new types of systems, their development & operation, but standardized enough to be communicated, compared and audited. Such operational models, based on artefact-based factors are supporting multiple aspects that are operationalized by standardized measurement tools, so called metrics. These operational models support the evaluation of coverage and precision, which facilitates establishing refinements cycles that ensure that e.g. quality models are detailed enough.

Additional aspect hierarchies support multiple views for different requirements. These are for example organization-based views, views focusing on strategic objects, financial views, change management or process-oriented views as well as portfolio or product family views. Also cost and value models fall under this category of operational models. The presented approach respectively supports the requirements of cost and value definitions necessary to apply target costing to software engineering and DevOps organizations.

In another exemplary implementation of the method and/or the computer system, approaches like Design to X or Quality function deployment (QFD) can be enhanced. Design to X is either design for excellence or is a placeholder for a specific issue. It refers to a set of design guidelines that try to avoid this issue. Interesting in this context is Design to cost which is actually a refence to value engineering or target costing. Quality function deployment (QFD) is a structured approach to defining customer needs or requirements and translating them into specific plans to produce products to meet those needs. The "voice of the customer" is the term to describe these stated and unstated customer needs or requirements. It produces insight what may have value in the eye of the customer and how it is to be realized. This helps in creating the proposed value models.

Another implemented use-case can be described with references to FIG. 1: Quality models for software are instruments to unify the definition of quality in the area of software. The underlying principles of a quality model can be used to solve the definition and unification challenge for operational models, in particular for models in the product and service development, even in the area of cost and value models.

Model definition step 1: This scenario is about creating and maintaining of model libraries. It includes import and export. Further it extends to the respective quality models to implement the rules the operational models should follow. Multiple aspect hierarchies can be defined to provide different points of view on the operational model data. Details like coverage and precision frequency are added. This is the definitory part of method. In the operationalization 2, the measurements are added to the operational factors. Configuration 3 of measurement tools is created to execute the measurement.

In some embodiments, the measurement steps are automated. Strategy alignment 4: In case an engineering strategy is available, this strategy needs to be aligned to the operational model, e.g. by explicit rules related to technical artefact and their quality. This use-case is concerned with the definition of the respective rules. In a verification step 5, model libraries for coverage and precision and additional rules or requirements from engineering strategy are checked. In an evaluation step 6, processing of observation data, created based on measurement configuration is provided. The improvement 7 step comprises model improvement as well as artefact improvement. The audit 8 comprises at least a timeline check of the whole process to ensure quality of created data. This process allows an improvement of the model over time.

To conclude, the presented method allows to bring different models, like quality models and functional models together despite different definitions. It even allows a spanning over several methods like value stream analysis, value engineering, QFD, design to cost, design to value, design thinking etc. Functionality and quality for development and operation are integrated under one model and system taking the dynamic feedback nature of DevOps systems into account. Even nontechnical requirement (like prioritization or time) can be integrated with technical development and operations' needs in closed feedback loops. The technical advantages based on formal models are high automation grade and seamless integration to functional and quality models. With the unification of several improvement approaches in engineering, these can be based on the same dataset, using the same measurement tools. Quality, degree of fulfillment and even non-monetary value created by software systems can be controlled in development and operation. This provides a basic method to facilitate digitalization for conglomerates that create or contribute to systems of systems or govern eco systems.

REFERENCES 1 model definition
2 Operationalization
3 Create configuration
4 alignment
5 Verification
6 Evaluation ev
7 Improvement
8 Audit
Stor storage component for models
Hist storage component for historian
Meas storage component for measurement tools
req requirements
req2 additional requirements, e.g. strategy requirements, user requirements, business rules, cost requirements
req3 further additional requirements
obs observation data
con configuration data
pr-con probe configuration
quan quantification data
imp improvement and/or audit results data output, improvement derivation
i-p improvement proposals
cs computer system
I/O interface component/layer
serv server component/layer, e.g. presentation server
app application component/layer
data data layer, e.g. comprising storage components stor and meas
pres1-4 presentation modules, e.g. presentation for
mob mobile devices
tab tablet
PC personal computer
desk control room desk
serv1-4 presentation server modules, e.g.
serv1 appServer aS
serv2 webFormats wF
serv3 3DFormats 3D-F
serv4 Layout, lay
app1-6 application modules, e.g.
app1 accounts
app2 data access
app3 modeler
app4 configurator
app5 evaluator
app6 auditor
DO DevOps
vc version control
b build
ut unit test
dep deploy
d-p deploy to production
at auto test
m&v measure & validate
fb feedback, e.g. production feedback
i-mod product roadmap, project plan, model, e.g. TAI-COS model,
ii-col collect data,
iii-d&o develop and operate
iv-adj Adjust roadmap and project plan
v-new plan new features, better features—planning of new features is based on available, more precise data.
q-m quality model
rul rules
meas measurements
fac factors
qu qualities
pr principals
sort sorting
agg aggregation
fac factoring

The invention claimed is:

1. A computer-implemented method for task-oriented system definition, implementation and operation, the method comprising:
importing a model with representative model data including predefined model parameters by an interface component;
importing one or more requirements for the model parameters by the interface component the one or more requirements including quality requirements, strategy requirements, business rules, and/or cost requirements for an alignment process;

executing measurement of the model and importing measurement results data, aggregating and evaluating the imported data, wherein the evaluation depends on the one or more requirements and the measurement results data;

operationalizing the model by adding measurements to the one or more requirements; and generating a task based on an algorithm performing a functional analysis of the model requirements and measurements, wherein the task includes at least one improvement to the model.

2. The computer-implemented method according to claim 1, further comprising creating a configuration of a measurement component.

3. The computer-implemented method according to claim 1, further comprising providing an alignment with additional requirements outside the model.

4. The computer-implemented method according to claim 1, further comprising providing a check of model libraries.

5. The computer-implemented method according to claim 1, further comprising providing a timeline check of the whole process to ensure quality of created task data.

6. The computer-implemented method according to claim 1, further comprising recursive refinements of tasks and their attributes.

7. The computer-implemented method according to claim 1, further comprising an implementation where split and/or detailed subtasks are compliant to the attributes required for the subtasks.

8. A computer system comprising:

a processor;

an interface component for importing a model with representative model data including predefined model parameters and importing one or more requirements for the model parameters including quality requirements, strategy requirements, business rules, and/or cost requirements for an alignment process;

a first computer-readable storage component storing imported model data;

a second computer-readable storage component storing measurement tools and a software component executing measurement tools on the model and importing measurement results data;

a software component aggregating and evaluating imported data, wherein the evaluation depends on the requirements and measurement results data;

a further software component for operationalizing the model, wherein measurements are added to the one or more requirements; and a task generation software component comprising an algorithm performing a functional analysis of the model requirements and generating a task including at least one improvement to the model.

9. The computer system according to claim 8, further comprising a software component for defining the model and/or a further storage component for history management and/or an application layer.

10. The computer system according to claim 8, wherein the interface component is arranged with a presentation layer.

11. The computer system according to claim 8, wherein the measurement tools provide measurement data for verification, evaluation, improvement, or audit components.

12. The computer system according to claim 8, further comprising an observed system component for an intelligent DevOps system.

* * * * *